United States Patent
Vossiek et al.

(10) Patent No.: US 11,733,348 B2
(45) Date of Patent: *Aug. 22, 2023

(54) METHOD AND DEVICE FOR COMPENSATING FOR PHASE NOISE

(71) Applicant: Symeo GmbH, Neubiberg (DE)

(72) Inventors: Martin Vossiek, Fürth (DE); Michael Gottinger, Buckenhof (DE); Peter Gulden, Erding (DE)

(73) Assignee: Symeo GmbH, Neubiberg (DE)

( * ) Notice: Subject to any disclaimer, the term of this patent is extended or adjusted under 35 U.S.C. 154(b) by 295 days.

This patent is subject to a terminal disclaimer.

(21) Appl. No.: 16/613,102

(22) PCT Filed: May 11, 2018

(86) PCT No.: PCT/EP2018/062192
§ 371 (c)(1),
(2) Date: Nov. 12, 2019

(87) PCT Pub. No.: WO2018/206755
PCT Pub. Date: Nov. 15, 2018

(65) Prior Publication Data
US 2021/0080541 A1    Mar. 18, 2021

(30) Foreign Application Priority Data
May 12, 2017    (DE) ............... 10 2017 110 403.8

(51) Int. Cl.
*G01S 7/35*    (2006.01)
*G01S 7/40*    (2006.01)
(Continued)

(52) U.S. Cl.
CPC ............... *G01S 7/354* (2013.01); *G01S 7/40* (2013.01); *G01S 7/4017* (2013.01);
(Continued)

(58) Field of Classification Search
CPC .......... G01S 7/354; G01S 7/40; G01S 7/4017; G01S 7/343
See application file for complete search history.

(56) References Cited

U.S. PATENT DOCUMENTS 4,388,622 A    6/1983    Fletcher, Jr.
5,423,076 A *  6/1995    Westergren ............ H04B 1/403
                                                              331/25
(Continued)

FOREIGN PATENT DOCUMENTS

CN    101911511 A      12/2010
CN    104573772 A  *    4/2015
(Continued)

OTHER PUBLICATIONS

"German Application No. 10 2017 110 403.8, Search Report dated Apr. 20, 2018", (Apr. 20, 2018), 8 pgs.
(Continued)

*Primary Examiner* — Timothy A Brainard
*Assistant Examiner* — Ismaaeel A. Siddiquee
(74) *Attorney, Agent, or Firm* — Schwegman Lundberg & Woessner, P.A.

(57) ABSTRACT

Phase noise compensation can be performed in a primary radar system, such as in transceiver hardware. A first reflected reception signal can be received, corresponding to a reflection of a first transmission signal from an object, and a first measurement signal can be generated using mixing or correlation of the first reflected reception signal and the first transmission signal. A second measurement signal can be similarly generated from a second transmission signal and a second reflected reception signal. The first and second measurement signals include respective components including complex conjugate representations of each other. The components correspond to interfering components associ-
(Continued)

ated with phase noise, and such respective components can cancel each other to suppress phase noise.

22 Claims, 2 Drawing Sheets

(51) Int. Cl.
    *G01S 13/34*     (2006.01)
    *G01S 13/36*     (2006.01)
(52) U.S. Cl.
    CPC ............. *G01S 13/343* (2013.01); *G01S 13/34* (2013.01); *G01S 13/36* (2013.01)

(56) References Cited

U.S. PATENT DOCUMENTS

| | | | |
|---|---|---|---|
| 6,278,398 | B1 | 8/2001 | Vossiek et al. |
| 6,625,424 | B1* | 9/2003 | Mohindra ................. H04B 1/30 455/87 |
| 7,623,064 | B2* | 11/2009 | Calderbank ............. G01S 7/024 342/194 |
| 7,940,743 | B2 | 5/2011 | Seisenberger et al. |
| 10,371,800 | B2 | 8/2019 | Huemer et al. |
| 2006/0181448 | A1* | 8/2006 | Natsume .................... G01S 7/36 342/111 |
| 2012/0200453 | A1* | 8/2012 | Brosche .................. H03M 3/47 342/175 |
| 2017/0176583 | A1 | 6/2017 | Gulden et al. |
| 2021/0072349 | A1* | 3/2021 | Mayer .................. G01S 7/4008 |
| 2021/0080540 | A1 | 3/2021 | Vossiek et al. |
| 2021/0149034 | A1* | 5/2021 | Yamanouchi ........... G01S 13/04 |

FOREIGN PATENT DOCUMENTS

| | | |
|---|---|---|
| CN | 106461770 A | 2/2017 |
| DE | 10157931 A1 | 6/2003 |
| DE | 102008050327 A1 | 5/2010 |
| DE | 102014104273 | 10/2015 |
| DE | 102014104273 A1 * 10/2015 ........... G01S 13/003 |
| DE | 102015100804 A1 | 7/2016 |
| JP | H0815422 | 1/1996 |
| JP | 2000206234 A | 7/2000 |
| KR | 20130079868 A | 7/2013 |
| WO | WO-9838524 A1 | 9/1998 |
| WO | WO-2010019975 A1 | 2/2010 |
| WO | WO-2017118621 | 7/2017 |
| WO | WO-2018206290 A1 | 11/2018 |
| WO | WO-2018206755 A1 | 11/2018 |

OTHER PUBLICATIONS

"International Application No. PCT/EP2018/062192, International Search Report and Written Opinion dated Jul. 25, 2018", (Jul. 25, 2018), 20 pgs.
Pichler, Markus, et al., "Phase-Error Measurement and Compensation in PLL Frequency Synthesizers for FMCW Sensors-I: Context and Application", IEEE Transactions on Circuits and Systems, Part I: Regular Papers, IEEE Service Center, New York, NY US; vol. 54, No. 5, (May 1, 2007), 1006-1017.
Thurn, Karsten, et al., "Noise in Homodyne FMCW radar systems and its effects on ranging precision", IEEE-MTTS International Microwave Symposium, Digest, IEEE, US, (Jun. 2, 2013), 1-3.
Vossiek, M., et al., "Novel FMCW radar system concept with adaptive compensation of phase errors", Microwave Conference (1996), 26th European, IEEE, Piscataway, NJ USA, (Sep. 6, 1996), 135-139.
"International Application No. PCT/EP2018/062192, International Preliminary Report on Patentability dated Nov. 21, 2019", (w/ English Translation), 8 pgs.
"U.S. Appl. No. 16/613,099, Non Final Office Action dated Sep. 3, 2021", 30 pgs.
"U.S. Appl. No. 16/613,099, Preliminary Amendment filed Nov. 12, 2019", 11 pgs.
"European Application Serial No. 18724837.2, Communication Pursuant to Article 94(3) EPC dated Dec. 6, 2021", 7 pgs.
"German Application No. 10 2017 110 404.6, Search Report dated Mar. 20, 2018", (Mar. 20, 2018), 7 pgs.
"International Application No. PCT/EP2018/060553, International Preliminary Report on Patentability dated Nov. 21, 2019", (w/ English Translation), 8 pgs.
"International Application No. PCT/EP2018/060553, International Search Report and Written Opinion dated Jul. 25, 18", (Jul. 25, 2018), 20 pgs.
"Japanese Application Serial No. 2019-562291, Notification of Reasons for Refusal dated Jan. 31, 2022", w/o English Translation, 4 pgs.
Appel, Soenke, et al., "MIMO FMCW Reader Concept for Locating Backscatter Transponders", IEEE Transactions on Microwave Theory and Techniques, Plenum, USA, vol. 64, No. 9, (Sep. 1, 2016), 2955-2967.
Roehr, Sven, et ai., "Precise Distance and Velocity Measurement for Real Time Locating in Multipath Environments Using a Frequency-Modulated Continuous-Wave Secondary Radar Approach", IEEE Transactions on Microwave Theory and Techniques, vol. 56, Issue 10 [abstract only], (Sep. 12, 2008), 2329-2339.
Roehr, Sven, et al., "Wireless local positioning—existing solutions and novel system concepts", 2015 IEEE MTT-S International Conference on Microwaves for Intelligent Mobility (ICMIM), (Apr. 27, 2015), 4 pgs.
Scheiblhofer, Stefan, et al., "Performance Analysis of Cooperative FMCW Radar Distance Measurement Systems", 2008 IEEE MTT-S International Microwave Symposium Digest, (Jun. 15, 2008), 121-124.
"U.S. Appl. No. 16/613,099, Final Office Action dated Jun. 1, 2022", 31 pgs.
"U.S. Appl. No. 16/613,099, Response filed Mar. 3, 2022 to Non Final Office Action dated Sep. 3, 2021", 16 pgs.
"U.S. Appl. No. 16/613,099, Response filed Nov. 30, 2022 to Final Office Action dated Jun. 1, 2022", 12 pgs.
"Japanese Application Serial No. 2019-562291, Examiners Decision of Final Refusal dated Aug. 29, 2022", w/ English Translation, 6 pgs.
"Japanese Application Serial No. 2019-562291, Response filed Apr. 28, 2022 to Notification of Reasons for Refusal dated Jan. 31, 2022", w/ English Claims, 14 pgs.
"Chinese Application Serial No. 201880031284.7, Office Action dated Feb. 20, 2023", w/ English Translation, 21 pgs.
"Korean Application Serial No. 10-2019-7033481, Notice of Preliminary Rejection dated Jun. 9, 2023", w/ English Translation, 15 pgs.

* cited by examiner

METHOD AND DEVICE FOR COMPENSATING FOR PHASE NOISE

PRIORITY CLAIM TO RELATED APPLICATIONS

This application is a U.S. national stage filing under 35 U.S.C. § 371 of International Application No. PCT/EP2018/062192, filed on 11 May 2018, and published as WO2018/206755 on 15 Nov. 2018, which claims priority to German Application No. 10 2017 110 403.8, filed on 12 May 2017, the benefit of priority of each of which is claimed herein, and which applications and publication are hereby incorporated herein by reference in their entirety.

The invention relates to a method and a device for compensating for noise, in particular phase noise, in a primary radar system, for example in a remote sensing system or in a system with a high proportion of phase noise.

Primary radar systems, in particular FMCW primary radar systems (where FMCW stands for Frequency Modulated Continuous Wave), are known in principle. A transmitted FMCW signal with a linear frequency ramp, which can be generated by a local oscillator, can be represented as $$s_{TX}(t) = e^{j2\pi(f_c t + \frac{\mu}{2} t^2)} e^{j\varphi_n(t)}$$

where $f_c$ is the carrier frequency, $\mu = B/T_s$ is the slope of the frequency ramp over time (sweep rate), and $\varphi_n(t)$ is the phase noise of the local oscillator. This signal is transmitted over a transmission channel, which delays the signal and attenuates it by a value A, which corresponds to the backscattering cross-section of the object to be observed. The reception signal $$s_{RX}(t) = A s_{TX}(t - \tau) = A e^{j2\pi(f_c(t-\tau) + \frac{\mu}{2}(t-\tau)^2)} e^{j\varphi_n(t-\tau)}$$

is mixed into the baseband by a mixer, according to $$s_m(t) = s_{TX}(t) s_{RX}^*(t) = A e^{j2\pi(f_c \tau + \frac{\mu}{2}(2t\tau - \tau^2))} e^{j(\varphi_n(t) - \varphi_n(t-\tau))} = A e^{j\Phi_m(t)}$$

(here the operation means the complex conjugation), wherein a propagation time of an electromagnetic wave in the transmission channel can be determined from the so-called beat frequency $$f_b(t) = \frac{1}{2\pi} \frac{d\Phi_m(t)}{dt} = \mu\tau + \frac{1}{2\pi} \frac{d}{dt}(\varphi_n(t) - \varphi_n(t-\tau)) = \mu\tau + \delta f(t)$$

by transformation, and a distance to an object can be determined therefrom. This may take place for example by means of Fourier transformation.

Alternatively, instead of a mixing, a correlation may also be carried out, preferably at low frequencies.

If the signal-to-noise ratio (SNR) is good, the correlated phase noise, that is to say the second component of $f_b(t)$, nevertheless represents a limit to the accuracy that can be achieved a remote sensing system. The variance of the estimate of the distance to the object depends here on the statistical properties of the random sequence $\delta f(t)$, that is to say in this case inter alia on the propagation time in the channel, and increases as the distance and/or propagation time increases. An additional influence due to thermal noise will be assumed to be much lower than the phase noise in this illustration and will therefore be ignored.

The object of the invention is to proposes a method and a device for effectively compensating for noise, in particular phase noise, using the simplest possible means.

This object is achieved in particular by a method and a device according to the independent claims.

In particular, the object is achieved by a method for compensating for noise, in particular phase noise, in a primary radar system, wherein a first transmission signal (first radar signal) containing a first interfering component, caused by the noise, is transmitted by a transceiving unit, wherein at least one second transmission signal (second radar signal) containing a second interfering component, caused by the noise, is transmitted by the transceiving unit simultaneously or in a temporally overlapping manner with the first transmission signal, wherein the transmission signals are preferably such that phase shifts and/or frequency shifts which result from the interfering components are at least partially compensated for during a further processing and evaluation of the transmission signals.

Preferably,
the first transmission signal is reflected at at least one object, so that a first reflected reception signal reaches the transceiver,
a first measurement signal is generated from the first transmission signal and the first reception signal, in particular by mixing,
the second transmission signal is reflected at at least one object (in particular the at least one object mentioned in the first indent), so that a second reception signal reaches the transceiver, and
a second measurement signal is generated from the second transmission signal and the second reception signal, in particular by mixing.

One (optionally independent) aspect of the invention lies in the fact that not only is a first transmission signal or first measurement signal generated, but also (at least) a second transmission signal or (at least) a second measurement signal which is such that phase shifts and/or frequency shifts (for example of measurement frequencies, in particular mixing frequencies and/or beat frequencies), caused by (phase) noise, can be at least partially cancelled out (or can be compensated for). As an alternative or in addition, instead of a mixing, a correlation can also be carried out, preferably at low frequencies.

The terms transmission signal and transmitted signal and the terms received signal and reception signal are used synonymously. The transmitted and received signals are in particular HF signals or radar signals (outgoing wirelessly from the transceiving unit or incoming wirelessly thereto).

A measurement signal is to be understood to mean in particular a mixed signal which is derived from a transmitted signal and a reflected (at an object) or received signal that is based on the transmitted signal. In particular, such a mixing may be a complex conjugate multiplication of the received (reflected) signal by the transmitted signal.

Overall, the method enables an effective reduction or (complete) suppression of (correlated) phase noise. Thus, for example, the accuracy of a distance determination in a remote sensing system can be improved.

Preferably, a first interfering component of the first measurement signal and a second interfering component of the second measurement signal are complex conjugate to one another. An effective reduction (or complete suppression) of (correlated) phase noise can thus take place particularly easily.

The transmission of the second signal preferably takes place simultaneously or at least in a temporally overlapping manner with the transmission of the first signal. A temporal overlap is to be understood to mean in particular that, at least during 20%, preferably during 50%, of the signal duration of the transmission of the first signal, the second signal is also being transmitted.

Preferably, the first transmitted signal has at least one factor which is complex conjugate to a factor of the second transmitted signal. An effective reduction (suppression) of phase noise can thus easily take place. In particular, measurement signals which have complex conjugate interfering components can easily be generated (preferably by mixing).

In one preferred embodiment, the first transmitted signal has at least one frequency ramp with a first slope and the second transmitted signal has at least one frequency ramp with a second slope, wherein the first slope has a different sign than the second slope. More preferably, the amounts of the first and second slope are (at least substantially) equal. Measurement signals (mixed signals) which reduce (remove) a phase noise can be generated particularly easily from such transmitted signals.

A base HF signal for the first and second measurement signal or for the first and second transmitted signal is preferably generated by the same HF generator (local oscillator, LO for short). The associated (correlated) phase noise can then be suppressed particularly effectively. In general, the first and the second transmitted signal are preferably such that they have a correlated phase noise.

A base HF signal is to be understood to mean in particular a high-frequency signal which comes (directly) from the output of a corresponding generator (oscillator). This base HF signal can then be subsequently modulated if necessary.

The base HF signal and/or the transmitted (HF) signals (or radar signals) may have a frequency or frequencies of at least 100 MHz or at least 1 GHz.

Preferably, the first transmitted signal or the first measurement signal is based on an output of a first modulation generator and the second transmitted signal or the second measurement signal is based on an output of a second modulation generator. Alternatively, the first and second transmitted signal or the first and second measurement signal may be based on an output of a joint modulation generator. If a joint modulation generator is used, use may be made in particular of a signal which is generated by means of direct digital synthesis (DDS).

Preferably, a (fundamental) signal for the first and/or second transmission signal (having a relatively low frequency) is generated and then the respective transmission signal is modulated by way of a modulation generator, in particular a vector modulator, wherein the first and/or second transmission signal is/are preferably generated by applying a modulation signal to a real or complex input of the modulation generator, in particular vector modulator, preferably such that the second—and preferably mirrored—transmission signal is generated in addition to the first transmission signal.

Preferably, a frequency (preferably containing propagation time information), in particular a beat frequency, is derived from the first and/or second measurement signal. As an alternative or in addition, the measurement signals or signals derived from the measurement signals or parts thereof, in particular a respective frequency (preferably containing propagation time information), preferably a beat frequency, are combined with one another, preferably added to one another.

In a first preferred alternative, the first measurement signal may be generated by a first mixer and the second measurement signal may be generated by a second mixer. In a second alternative, the first measurement signal and the second measurement signal may be generated by a joint (in particular complex) mixer. Measurement signals having the desired properties can thus easily be generated.

In embodiments, the (first and second) measurement signals may be mixed products of FMCW signals, in particular FMCW ramps, SFCW signals (where SFCW stands for Stepped Frequency Continuous Wave) or OFDM signals (where OFDM stands for Orthogonal Frequency-Division Multiplexing). These signals are preferably generated by way of a (joint) local oscillator.

The object mentioned above is also achieved by a device for compensating for noise, in particular phase noise, in a primary radar system, in particular for carrying out the above method, comprising a transceiving unit for generating and transmitting a first transmission signal containing a first interfering component, caused by the noise, and for generating and transmitting, simultaneously or in a temporally overlapping manner, at least one second transmission signal containing a second interfering component, caused by the noise, such that phase shifts and/or frequency shifts which result from the interfering components can be at least partially compensated for during a further processing and evaluation of the transmission signals.

Preferably, a measurement signal generating means is provided for generating a first ($s_{m1}(t)$) measurement signal from the first transmission signal and a first reception signal, which is based on a reflection of the first transmission signal, and for generating at least one second ($s_{m2}(t)$) measurement signal from the second transmission signal and a second reception signal, which is based on a reflection of the second transmission signal.

A first interfering component of the first measurement signal and a second interfering component of the second measurement signal are preferably complex conjugate to one another.

Preferably, the first transmission signal has a first factor which is complex conjugate to a second factor of the second transmission signal ($s_2(t)$).

Preferably, the device comprises a transceiver for transmitting a first signal and for receiving a first reflected signal, which is reflected at at least one object, and for transmitting a second signal and for receiving a second reflected signal, which is reflected at at least one object.

In one preferred embodiment, the transceiving unit comprises a transmitting antenna and a receiving antenna, wherein the transmitting antenna transmits the first and second signal and the receiving antenna receives the first and second reflected signal. In an alternative embodiment, the transceiving unit may comprise a joint transmitting/receiving antenna, wherein the joint transmitting/receiving antenna transmits the first signal and receives the first reflected signal and transmits the second signal and receives the second reflected signal. The first and the second signal may optionally also be transmitted via different (a first transmitting antenna and a second transmitting antenna). In principle, a plurality of transmitting and/or receiving antennas may be provided.

The measurement signal generating means, in particular comprising one or more mixers, is preferably provided for generating the first measurement signal from the transmitted first signal and the first reflected signal, in particular by mixing, and for generating the second measurement signal from the transmitted second signal and the second reflected signal, in particular by mixing.

In one embodiment, the measurement signal generating means comprises a first measurement signal generating unit, in particular a first mixer, and a second measurement signal generating unit, in particular a second mixer, wherein the first measurement signal generating unit generates the first measurement signal, in particular by mixing, and the second measurement signal generating unit generates the second measurement signal, in particular by mixing. In an alternative embodiment, the measurement signal generating means comprises a joint measurement signal generating unit, in particular a joint mixer, wherein the joint measurement signal generating unit generates the first measurement signal, in particular by mixing, and generates the second measurement signal, in particular by mixing.

The device preferably has an HF generator for generating a base HF signal for the first and second measurement signal or for the first and second transmitted signal. The HF generator may be a voltage-controlled oscillator (VCO). Preferably, a first modulation generator is provided, on the output of which the first transmitted signal or the first measurement signal is based, and a second modulation generator is provided, on the output of which the second transmitted signal or the second measurement signal is based. Alternatively, a joint modulation generator may be provided, on the output of which the first and second transmitted signal or the first and second measurement signal are based.

The object mentioned above is also achieved by a use of the above method and/or of the above device for increasing the accuracy of a distance measurement in a remote sensing system.

The above method and/or the above device can optionally also be used in a system (in particular with a relatively simply constructed or entirely omitted PLL) for measuring short distances.

The above object is also achieved by a radar system, in particular a primary radar system (for remote sensing), which is configured to carry out the above method and/or comprises a device of the above type.

In principle, a first measurement signal and exactly one second measurement signal can be used. However, it is also possible to use more than two measurement signals. As long as at least one second measurement signal is configured such that a frequency shift caused by (correlated) noise, in particular phase noise, is at least partially opposite to a frequency shift of the first measurement signal that is caused by the noise, in particular phase noise, then ultimately at least a reduction of the phase noise can be achieved. By way of example, it would also be conceivable to use three measurement signals, wherein the second and third measurement signals have an opposite frequency shift to the first measurement signal, so that overall a (correlated) noise, in particular phase noise, can be effectively compensated for.

The invention will be explained in greater detail below on the basis of exemplary embodiments and figures.

In the figures.

In the following description, the same reference numerals are used for identical and equivalent parts.

Figure 1:
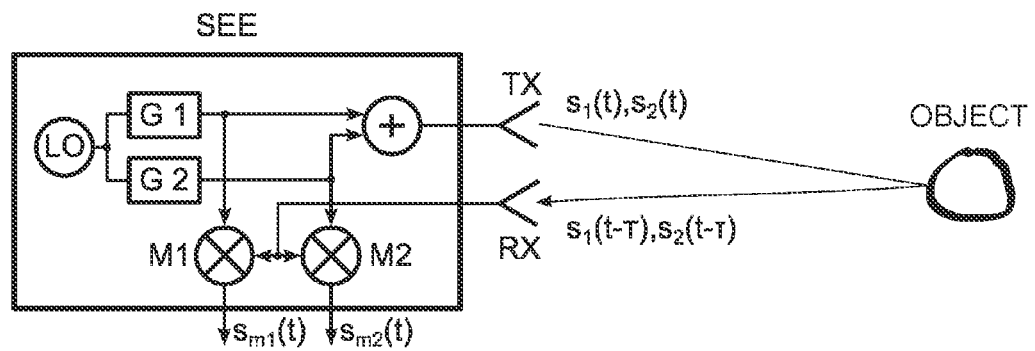
FIG. 1 shows a schematic representation of a device according to the invention for compensating for phase noise.

FIG. 1 shows a primary radar system. This comprises a transceiving unit SEE having at least one local oscillator LO, two mixers M1 and M2 and two modulation generators G1 and G2. The primary radar system shown in FIG. 1 is intended to be used in particular to determine a distance to one or more objects which may be separated from the transceiving unit SEE by a reciprocal transmission channel (usually an air transmission channel). To do this, a modulated signal is transmitted over the transmission channel by means of a transmitting antenna TX, is received by a receiving antenna RX, and then is mixed into a baseband by the mixers M1, M2. A frequency shift (caused by a defined propagation time) of the mixed signal can then be (digitally) processed. The distance information can then be obtained therefrom.

The matter of interest here is in particular that of (completely) compensating for correlated phase noise by means of a specifically configured signal form. The intention is thus for it to be possible on the one hand to place lower demands on the quality (for example frequency stability) of components which are used to generate a high-frequency (carrier) signal. On the other hand, the phase noise level preferably does not (any longer) represent a lower limit for the accuracy of the distance measurement.

In the embodiment shown in FIG. 1, a first measurement signal $s_{m1}(t)$ (mixed signal) is generated. This can then be received and further processed (as described in detail below) by a further component (which may optionally be a constituent part of the transceiving unit SEE). Simultaneously (or at least in a temporally overlapping manner), a second measurement signal $s_{m2}(t)$ (in particular mixed signal) is generated and is received and further processed by the further component. The second measurement signal (mixed signal) is characterized in that a frequency shift caused by phase noise is (exactly) opposite to the first measurement signal (first mixed signal), which is transmitted and received simultaneously (or at least in a temporally overlapping manner).

FIG. 1 shows a (relatively simple) structure, in which the first and second signal are generated from the same clock source LO by way of the modulation generators G1 and G2. Alternatively, it is also possible for just one modulation generator to be provided; by way of example, a modulation generator which operates by means of direct digital synthesis (DDS) may be used. This may have the result that the two measurement signals (the first and the second measurement signal) are oppositely influenced by noise components (in particular by phase noise or uniformly occurring non-linearities of FMCW ramps). The mixing process by way of the one or both mixers may in principle generate four signal components, of which one component, which is relevant for the measurement, has a relatively low beat frequency and can be separated from the high-frequency components, for example by way of a low-pass filter configured as hardware and/or software.

Figure 2:
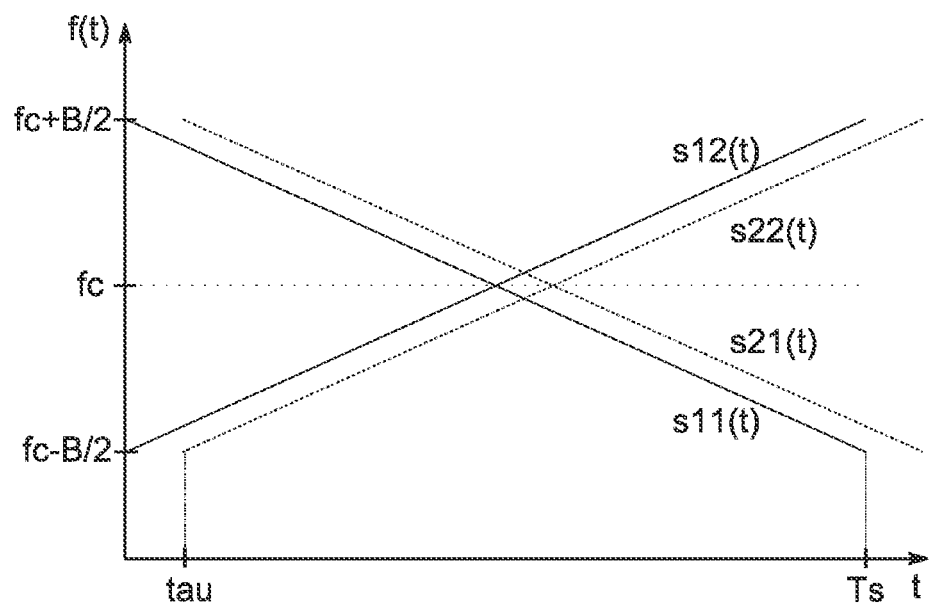
FIG. 2 shows a frequency diagram.

FIG. 2 shows a characteristic of transmitted and received signals over time. Here, $s12(t)$ is the transmission signal, known from the above description of a conventional FMCW radar, in the form of a rising (linear) frequency ramp, and $s22(t)$ is the reception signal that has been reflected at an object. The signal $s12(t)$ will hereinafter be referred to as the first transmitted signal. The signal $s22(t)$ will hereinafter be referred to as the first reflected signal. In addition, a second signal $s11(t)$ is simultaneously transmitted, reflected, and received after a propagation time in the transmission channel (this being referred to as the reflected second signal s21(t)). It is important here that a (ramp) slope of this second transmitted signal s22(t) is selected to be negative (or with a different sign than the first transmitted signal s12(t)).

In general, the characteristic in FIG. 2 is to be regarded only as one possible embodiment. By way of example, it is alternatively also possible for just a portion of the signal characteristic shown therein to be selected and/or used. In particular, a time-shifted (for example starting at Ts/2) portion may also be selected. One possible alternative would also be the (simultaneous) use of multiple frequency ramps, for example multiple second transmitted signals or second measurement signals (mixed signals). In principle, other radar signal forms may also be used, such as for example SFCW (Stepped Frequency Continuous Wave) or orthogonal frequency division multiplexing (OFDM), preferably at least as long as the second measurement signal (mixed signal) is complex conjugate to the first measurement signal (mixed signal).

The transmitted signals shown in FIG. 1 can be described by $$s_{11}(t) = e^{j2\pi\left(\left(f_c+\frac{B}{2}\right)t-\frac{\mu}{2}t^2\right)} e^{j\varphi_n(t)}$$

and $$s_{12}(t) = e^{j2\pi\left(\left(f_c-\frac{B}{2}\right)t+\frac{\mu}{2}t^2\right)} e^{j\varphi_n(t)}$$

where B is the bandwidth used by the radar system and $\mu=B/T_s$ is the sweep rate (that is to say the increase in frequency per unit of time). The received signals $s_{21}(t)=As_{11}(t-\tau)$ and $s_{22}(t)=As_{12}(t-\tau)$ are also considered here as an attenuated and time-shifted version of the transmitted signal. After the process of mixing the transmitted signals with the received signals and low-pass filtering (preferably carried out by the hardware of the measuring system in order to reduce thermal noise and interference with other radio applications), the mixed products $$s_{m1}(t) = s_{11}^*(t)s_{21}(t) = Ae^{j2\pi\left(-\left(f_c+\frac{B}{2}\right)\tau+\mu\tau t-\frac{\mu}{2}\tau^2\right)}e^{j(-\varphi_n(t)+\varphi_n(t-\tau))} = Ae^{j\Phi_{m1}(t)}$$

and $$s_{m2}(t) = s_{22}(t)s_{12}^*(t) = Ae^{j2\pi\left(\left(f_c-\frac{B}{2}\right)\tau+\mu\tau t-\frac{\mu}{2}\tau^2\right)}e^{j(\varphi_n(t)-\varphi_n(t-\tau))} = Ae^{j\Phi_{m2}(t)}$$

are obtained.

Figure 3:
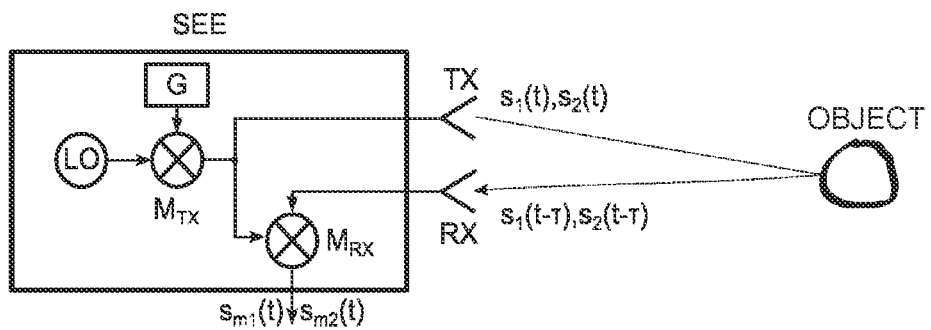
FIG. 3 shows an alternative embodiment of a device according to the invention.

It will be assumed here that the measuring system can only process positive frequencies, which corresponds to a basic structure according to FIG. 1. A description for a system according to FIGS. 3 and 4 can be found analogously by a person skilled in the art. By way of these mixed products, the two beat frequencies $$f_{b1}(t) = \frac{1}{2\pi}\frac{d\Phi_{m1}(t)}{dt} = \mu\tau - \frac{1}{2\pi}\frac{d}{dt}(\varphi_n(t)-\varphi_n(t-\tau)) = \mu\tau + \delta f(t)$$

and $$f_{b2}(t) = \frac{1}{2\pi}\frac{d\Phi_{m2}(t)}{dt} = \mu\tau + \frac{1}{2\pi}\frac{d}{dt}(\varphi_n(t)-\varphi_n(t-\tau)) = \mu\tau - \delta f(t)$$

can be calculated by differentiation, said beat frequencies being subject, as in the case shown above, to a statistical deviation caused by the correlated noise component $\delta f(t)$. Due to the complex conjugate phase characteristic of the mixed signals, the signal $f_{b1}(t)$ shifts towards the higher frequencies and the signal $f_{b2}(t)$ shifts towards the lower frequencies if $\delta f(t)$ is positive.

Summing then gives the (synthetic) measurement frequency $$f_b(t)=f_{b1}(t)+f_{b2}(t)=2\mu\tau,$$

which no longer has any dependence on the correlated phase noise $\delta f(t)$. This result can be solved for $\tau$, and the distance to an object can be estimated via the relationship $\tau=2x/c_0$ using the propagation speed $c_0$ of the electromagnetic wave.

Due to the linear relationship, it is possible to detect multiple objects, that is to say to receive multiple time-shifted and attenuated copies (superposition, or linear combination of target responses) of the transmitted signal.

The embodiment shown in FIG. 1 comprises two (real-value) mixers, which can be used in particular for separating upsweep and downsweep. These may optionally be replaced by just one (complex) mixer (in particular the mixer $M_{RX}$ in FIG. 3). In this case, one measurement signal (mixed signal) can be generated with a positive frequency and a second measurement signal (mixed signal) can be generated with a negative frequency. As an alternative or in addition, the two modulation generators G1 and G2 in FIG. 1 may also be replaced by one modulation generator G (see FIG. 3). The signal thereof may then optionally be mixed by a transmitting mixer $M_{TX}$, wherein the two transmitted signals (shown in FIG. 3) may optionally represent an upper and a lower sideband.

Figure 4:
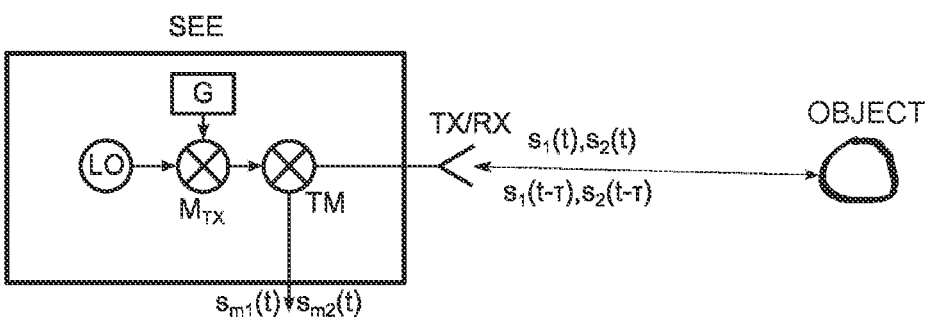
FIG. 4 shows a further embodiment of the device according to the invention.

In the embodiment shown in FIG. 4, a single antenna is provided instead of two (separate) transmitting and receiving antennas, which single antenna is used (jointly) for transmitting and receiving. In this case, a transmission mixer (TM) may be used, which in particular may have advantageous transmission properties in the case of FMCW systems.

The method described above and the system described above can be used to suppress phase noise, in particular also to reduce for example hardware requirements (such as, for example, in terms of the quality of a phase-locked loop) so as to generate a high-frequency carrier signal with little phase noise. Any error resulting therefrom can (subsequently) be compensated for by the method described above.

It should be noted at this point that all the parts and functions described above are claimed as essential to the invention individually and in any combination, particularly the details shown in the drawings. Modifications thereof are familiar to a person skilled in the art.

LIST OF REFERENCE SIGNS

G modulation generator
G1 modulation generator
G2 modulation generator
LO local oscillator
M mixer
M1 mixer
M2 mixer
$M_{RX}$ (receiving) mixer
$M_{TX}$ (transmitting) mixer
RX receiving antenna
$s_1(t)$ first signal
$s_2(t)$ second signal
$s_1(t-\tau)$ first reflected and received signal
$s_2(t-\tau)$ second reflected and received signal
$s_{m1}(t)$ first measurement signal (mixed signal)
$S_{m2}(t)$ second measurement signal (mixed signal)

SEE transceiving unit
TM (transmission) mixer
TX transmitting antenna

The invention claimed is:

1. A method for compensating for noise in a primary radar system, the method comprising:
using a transceiver, transmitting a first transmission signal containing a first interfering component, caused by the noise;
using the transceiver, transmitting at least one second transmission signal containing a second interfering component, caused by the noise, in a temporally overlapping manner with the first transmission signal, the first transmission signal comprising at least one frequency ramp with a first slope and the at least one second transmission signal comprising at least one frequency ramp with a second slope having a sign opposite the first slope; and
compensating for at least one of phase shifts or frequency shifts resulting from the first and second interfering components by evaluation of the transmission signals, the compensating comprising:
receiving a first reflected reception signal corresponding to a reflection of the first transmission signal from an object;
generating a first measurement signal using mixing or correlation of the first reflected reception signal and the first transmission signal;
receiving a second reflected reception signal corresponding to a reflection of the second transmission signal from an object; and
generating a second measurement signal using mixing or correlation of the second reflected reception signal and the second transmission signal;
wherein the first measurement signal and the second measurement signal comprise respective components including complex conjugate representations of each other, the respective components corresponding to the first and second interfering components.

2. The method according to claim 1, wherein a first interfering component, resulting from the noise, of the first measurement signal and a second interfering component, resulting from the noise, of the second measurement signal represent complex conjugates of each other.

3. The method according to claim 1, wherein the first transmission signal has a first factor which represents a complex conjugate to a second factor of the second transmission signal.

4. The method according to claim 1, wherein a value of the first slope and a value of the second slope are substantially equal.

5. The method according to claim 1, wherein a base signal used for generation of the first and second measurement signals, or the first and second transmission signals is generated by a shared generator.

6. The method according to claim 1, wherein the first transmission signal or the first measurement signal is based on an output of a first modulation generator; and
wherein the second transmission signal or the second measurement signal is based on an output of a second modulation generator.

7. The method according to claim 1, wherein a fundamental signal for at least one of the first or second transmission signals is generated and then the respective transmission signal is modulated using a vector modulator; and
wherein at least one of the first or second transmission signals is generated by applying a modulation signal to a real signal input or complex signal input of the vector modulator, to contemporaneously generate the first transmission signal and a mirror representation of the first transmission signal defining the second transmission signal.

8. The method according to claim 1,
wherein a frequency corresponding to propagation time information, is derived from at least one of the first or second measurement signals.

9. The method according to claim 1, wherein the first measurement signal is generated by a first mixer and the second measurement signal is generated by a second mixer.

10. The method according to claim 1, wherein the first and second measurement signals comprise mixer outputs representing products of FMCW ramps.

11. The method of claim 1, wherein a beat frequency corresponding to propagation time information, is derived from at least one of the first or second measurement signals.

12. A device for compensating for noise in a primary radar system, the device comprising:
a transceiver configured to:
generate and transmit a first transmission signal containing a first interfering component, caused by the noise, the first transmission signal comprising at least one frequency ramp with a first slope; and
generate and transmit, in a temporally overlapping manner, a second transmission signal containing a second interfering component, caused by the noise, the second transmission signal comprising at least one frequency ramp with a second slope having a sign opposite the first slope; and
compensate for at least one of phase shifts or frequency shifts resulting from the first and second interfering components using the first and second transmission signals, the compensating comprising:
receiving a first reflected reception signal corresponding to a reflection of the first transmission signal from an object;
generating a first measurement signal using mixing or correlation of the first reflected reception signal and the first transmission signal;
receiving a second reflected reception signal corresponding to a reflection of the second transmission signal from an object;
generating a second measurement signal using mixing or correlation of the second reflected reception signal and the second transmission signal;
wherein the first measurement signal and the second measurement signal comprise respective components including complex conjugate representations of each other.

13. The device according to claim 12, wherein a first interfering component, resulting from the noise, of the first measurement signal and a second interfering component, resulting from the noise, of the second measurement signal represent complex conjugates of each other.

14. The device according to claim 12, wherein the first transmission signal has a first factor which represents a complex conjugate to a second factor of the second transmission signal.

15. The device according to claim 12, wherein the transceiver comprises a transmitting antenna (TX) and a receiving antenna (RX); and wherein the transmitting antenna (TX) transmits the first and second transmission signals and the receiving antenna (RX) receives the first and second reflected reception signals.

16. The device according to claim 12, comprising one or more mixers configured to generate at least one of the first measurement signal from the first transmission signal and the first reception signal by mixing or the second measurement signal from the second transmission signal and the second reception signal by mixing.

17. The device according to claim 12, comprising a joint mixer configured to generate the first measurement signal and the second measurement signal by mixing.

18. The device according to claim 12, comprising:
a shared generator for generating a base signal for the first and second transmission signals or for the first and second measurement signals.

19. The device according to claim 12, comprising a vector modulator including an output configured to provide the first transmission signal and the second transmission signal.

20. The device of claim 12, wherein the transceiver comprises a joint transmitting/receiving antenna (TX/RX) configured to transmit the first transmission signal and to receive the first reflected reception signal, and to transmit the second transmission signal and to receive the second reflected reception signal.

21. The device of claim 12, comprising a vector modulator including an output configured to provide the first measurement signal and the second measurement signal.

22. The device of claim 12, wherein a beat frequency corresponding to propagation time information, is derived from at least one of the first or second measurement signals.

* * * * *